(12) United States Patent
Bansal et al.

(10) Patent No.: US 7,385,960 B2
(45) Date of Patent: Jun. 10, 2008

(54) MEASUREMENT BASED MECHANISM TO ENABLE TWO WIRELESS DEVICES TO DIRECTLY COMMUNICATE WITH EACH OTHER TO SUPPORT TRAFFIC PRIORITIZATION

(75) Inventors: Deepak Bansal, Redmond, WA (US); Abhishek Abhishek, Woodinville, WA (US); Francis Duong, Bellevue, WA (US); Tarek Z. Elabbady, Redmond, WA (US); Khawar M. Zuberi, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 430 days.

(21) Appl. No.: 11/070,679

(22) Filed: Feb. 28, 2005

(65) Prior Publication Data

US 2006/0193292 A1 Aug. 31, 2006

(51) Int. Cl.
*H04Q 7/00* (2006.01)
*H04Q 7/24* (2006.01)

(52) U.S. Cl. ............... 370/338; 370/331; 370/332; 370/241; 455/41.2; 455/452.1

(58) Field of Classification Search ........ 370/332, 370/338, 331, 241; 455/41.2, 452.1
See application file for complete search history.

(56) References Cited

U.S. PATENT DOCUMENTS

| | | | |
|---|---|---|---|
| 6,799,047 B1 | 9/2004 | Bahl et al. | |
| 6,816,886 B2 * | 11/2004 | Elvanoglu et al. | 709/206 |
| 6,826,617 B1 | 11/2004 | Ansell et al. | |
| 6,839,560 B1 | 1/2005 | Bahl et al. | |
| 7,130,646 B2 * | 10/2006 | Wang | 455/456.5 |
| 7,190,686 B1 * | 3/2007 | Beals | 370/337 |
| 7,245,915 B2 * | 7/2007 | Matta et al. | 455/436 |
| 2003/0069018 A1 * | 4/2003 | Matta et al. | 455/436 |
| 2004/0090924 A1 * | 5/2004 | Giaimo et al. | 370/252 |
| 2005/0070303 A1 * | 3/2005 | Lagno et al. | 455/456.1 |
| 2005/0141468 A1 * | 6/2005 | Kim et al. | 370/338 |
| 2005/0271021 A1 * | 12/2005 | Alemany et al. | 370/338 |
| 2005/0271174 A1 * | 12/2005 | DiRenzo et al. | 375/354 |
| 2005/0272420 A1 * | 12/2005 | Matsuda et al. | 455/426.2 |
| 2006/0092890 A1 * | 5/2006 | Gupta et al. | 370/338 |
| 2006/0126645 A1 * | 6/2006 | Devarapalli et al. | 370/401 |

* cited by examiner

*Primary Examiner*—Duc Nguyen
*Assistant Examiner*—Julio R Perez
(74) *Attorney, Agent, or Firm*—Wolf, Greenfield & Sacks, P.C.

(57) ABSTRACT

A wireless device communications mode selector dynamically establishes an optimal communication mode between wireless devices and/or access point, such that stations communicate directly with each other or indirectly through an existing AP depending upon which mode would yield higher throughput under present network conditions and configuration. In an embodiment of the invention, a measurement based mechanism is used to decide which communication mode is more efficient. If it is decided that direct communication is optimal, the two stations can either form an adhoc network or an STA can be dynamically configured to become a wireless repeater access point (soft AP).

12 Claims, 9 Drawing Sheets

MEASUREMENT BASED MECHANISM TO ENABLE TWO WIRELESS DEVICES TO DIRECTLY COMMUNICATE WITH EACH OTHER TO SUPPORT TRAFFIC PRIORITIZATION

FIELD OF THE INVENTION

This invention pertains generally to computer networking and, more particularly, to improving bandwidth by enabling direct communication rather than indirect communication when doing so would yield greater throughput.

BACKGROUND OF THE INVENTION

As the use of wireless networking technologies in home environments increases, the need for ensuring high bandwidth and traffic prioritization increases. For example, much of the material transported over networks in the home environment is entertainment material, and most of this material is video and/or audio intensive. Audio and video materials require adequate average bandwidth as well as a certain level of reliable and timely transmission, perhaps ahead of other non-time sensitive information.

One way to allow interconnectivity of devices is through a wireless LAN. Wireless LANs are becoming an increasingly popular technology for interconnecting devices that are in close proximity (e.g., within the range of IEEE 802.11 technologies) to each other. The most common way to maintain a wireless LAN is in what is known as infrastructure mode. This mode entails the use of a specialized device known as an Access Point (AP). There is typically a single AP per wireless LAN and all the wireless stations (STAs) and the AP in a wireless LAN communicate using the same channel (frequency). Multiple wireless LANs may communicate with each other to form an extended wireless LAN. In addition to the AP and STAs in infrastructure mode, there may also be devices known as wireless repeater APs. A wireless repeater AP attaches to an AP as an STA but simultaneously advertises itself as another AP with the same network ID and channel number as the AP it is attached to.

An alternative manner of interconnecting wireless devices involves the use of what is known as "adhoc" mode. In this mode, there is no specialized AP device. An ad-hoc network can be formed for example when all the STAs that are to be a part of the adhoc network are configured with the same network name and security keys.

Figure 1:
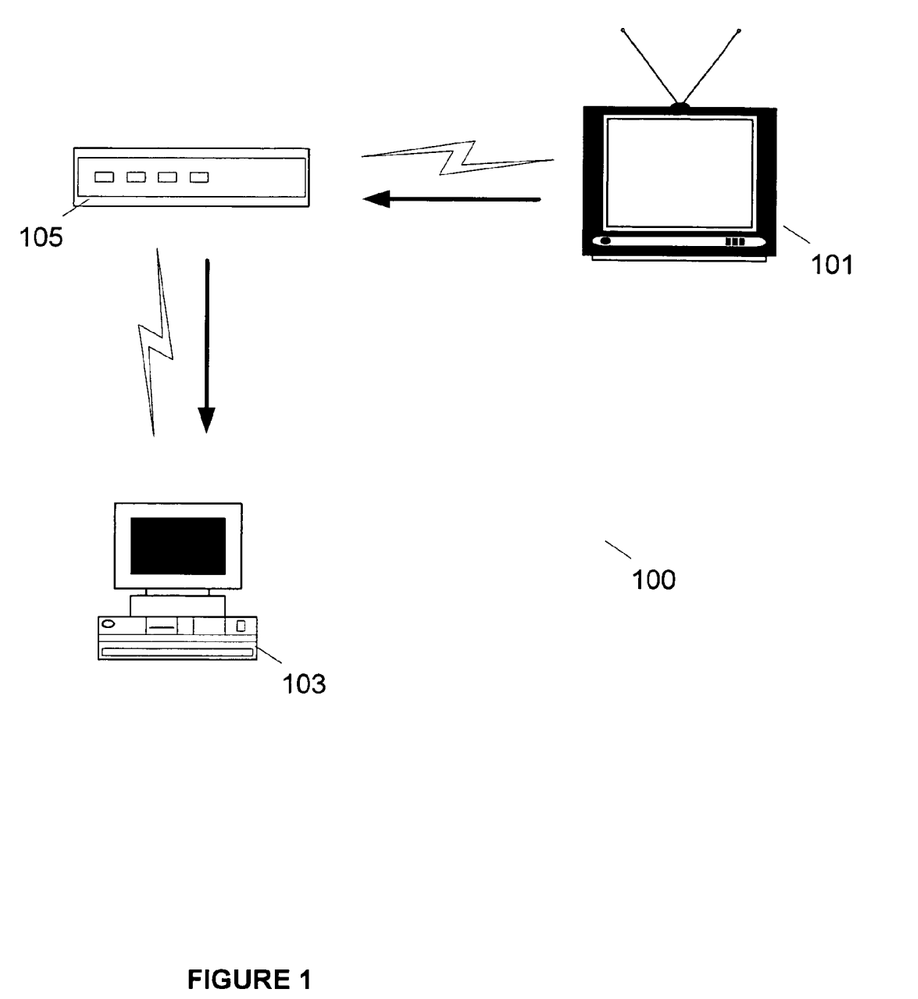
FIG. 1 is a schematic network diagram showing bidirectional communications between wireless stations via a wireless access point.
Figure 2:
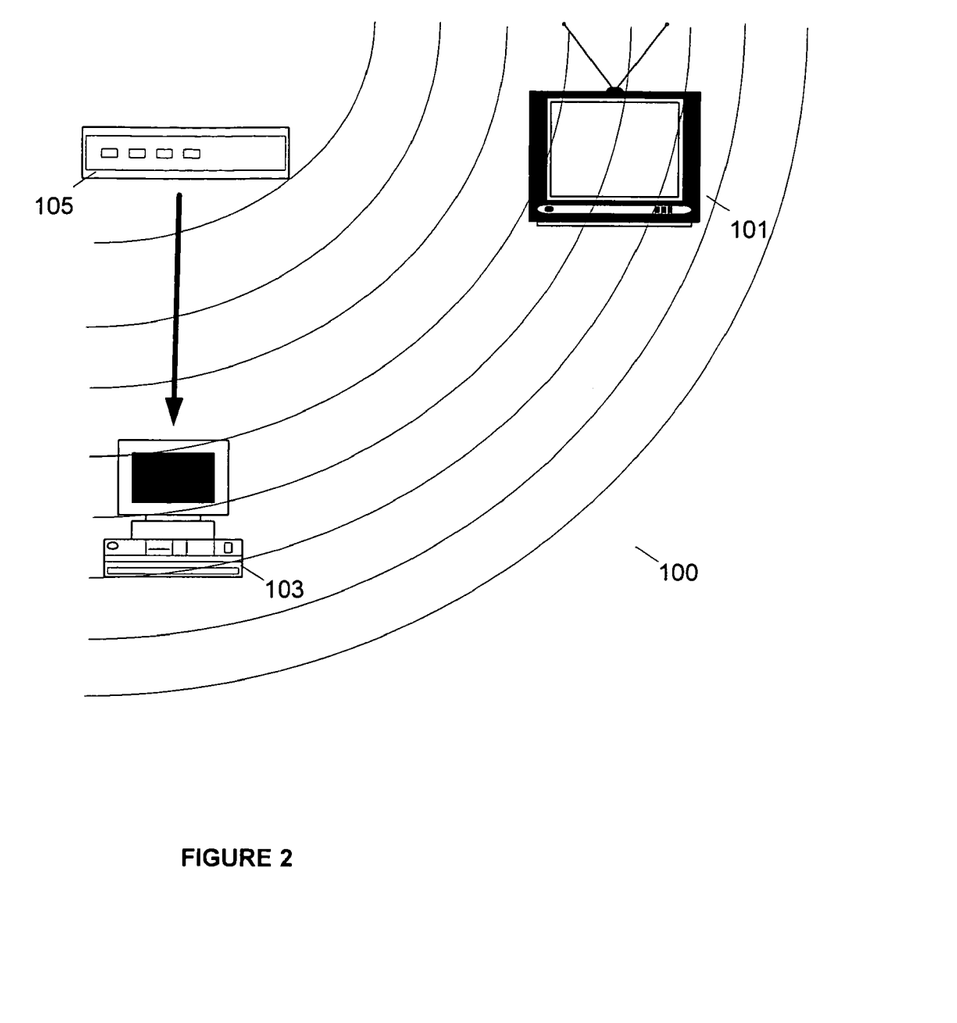
FIG. 2 is a schematic network diagram showing a communications between a wireless station and a wireless access point, wherein the electromagnetic radiation field is pictorially illustrated.

When two STAs communicate with each other through an AP (in infrastructure mode), the communication happens twice over the wireless link, once from the sending STA to the AP and then again from the AP to the receiving STA. FIG. 1 shows a networking environment 100 in which two STAs 101, 103 are communicating with each other through an AP 105. In this environment, all communications between STAs 101, 103 go over the wireless channel twice, once from the sending STA 101 to the AP 105 and then from the AP 105 to the receiving STA 103, resulting in wastage of wireless bandwidth. This can be appreciated when it is considered that a typical radio transmission is largely omnidirectional and fills the allotted channel locally. Thus, from the standpoint of channel usage, a radio transmission from an AP to an STA can be envisioned more as is shown in FIG. 2. Thus, when any radio transmission is ongoing in a particular locale, no other transmissions using the same channel in the same locale are possible. For the sake of clarity, radio transmissions will generally be illustrated herein as passing just between the parties to the communication, but it will be understood that radio transmissions are essentially omnidirectional.

The duplication of transmissions in a typical wireless LAN operating in infrastructure mode results in wastage of wireless bandwidth, e.g., data transfer capacity is approximately half of what it would optimally be. Such waste is generally undesirable, and is particularly problematic in home or other environments where the transmission of audio and/or video data requires high bandwidth and optimal channel usage.

BRIEF SUMMARY OF THE INVENTION

As discussed above, FIG. 1 shows two STAs 101, 103 communicating with each other through an AP with the attendant waste of wireless bandwidth. In general, wireless bandwidth can be more efficiently used if STAs directly communicate with each other without going through the AP. However, this may not be possible or optimal if the STAs are not within range of each other (even though both are in the range of an AP) or are far enough from each other to result in lower throughput if they communicate with each other directly than if they go through the AP. Typically, the throughput on wireless channels is reduced as the distance between devices increases.

According to various embodiments of the invention, a mechanism is provided for dynamically establishing an optimal communication mode between wireless devices, such that STAs communicate directly (either by forming a new wireless LAN using a wireless repeater AP or in adhoc mode) with each other or indirectly through an existing AP depending upon which mode would yield higher throughput under present network conditions and configuration.

In an embodiment of the invention, a measurement based mechanism is used to decide which communication mode is more efficient. If it is decided that direct communication is optimal, then the two STAs can either form an adhoc network or with soft MAC capability, as that provided by Microsoft's™ Native WiFi, an STA can be dynamically configured to become a wireless repeater access point (soft AP). The measurements are also used to detect the support of traffic prioritization at the AP and if an application needs support for traffic prioritization, it can be dynamically enabled at the wireless repeater AP if the two STAs decide to communicate directly with one of them becoming the wireless repeater AP.

The proposed invention has significant application in home entertainment scenarios. Media streaming between devices (such as Microsoft's MCE PC and Microsoft's Bobsled or Sony's Vaio PC and Sony's Roomlink) in the home over wireless LAN can be seriously constrained by the limited bandwidth of the wireless LAN. Further, interference from other applications and lack of prioritization support at the AP can degrade the media application's user experience. The proposed invention helps avoid wastage of wireless bandwidth and protects multimedia stream from other traffic where the physical location of entertainment devices allows for this. The invention also has application in any other scenario where direct communication between STAs is permitted.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Methods and systems for optimizing communications paths in a wireless network will now be described with respect to various embodiments. The skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention.

The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 3:
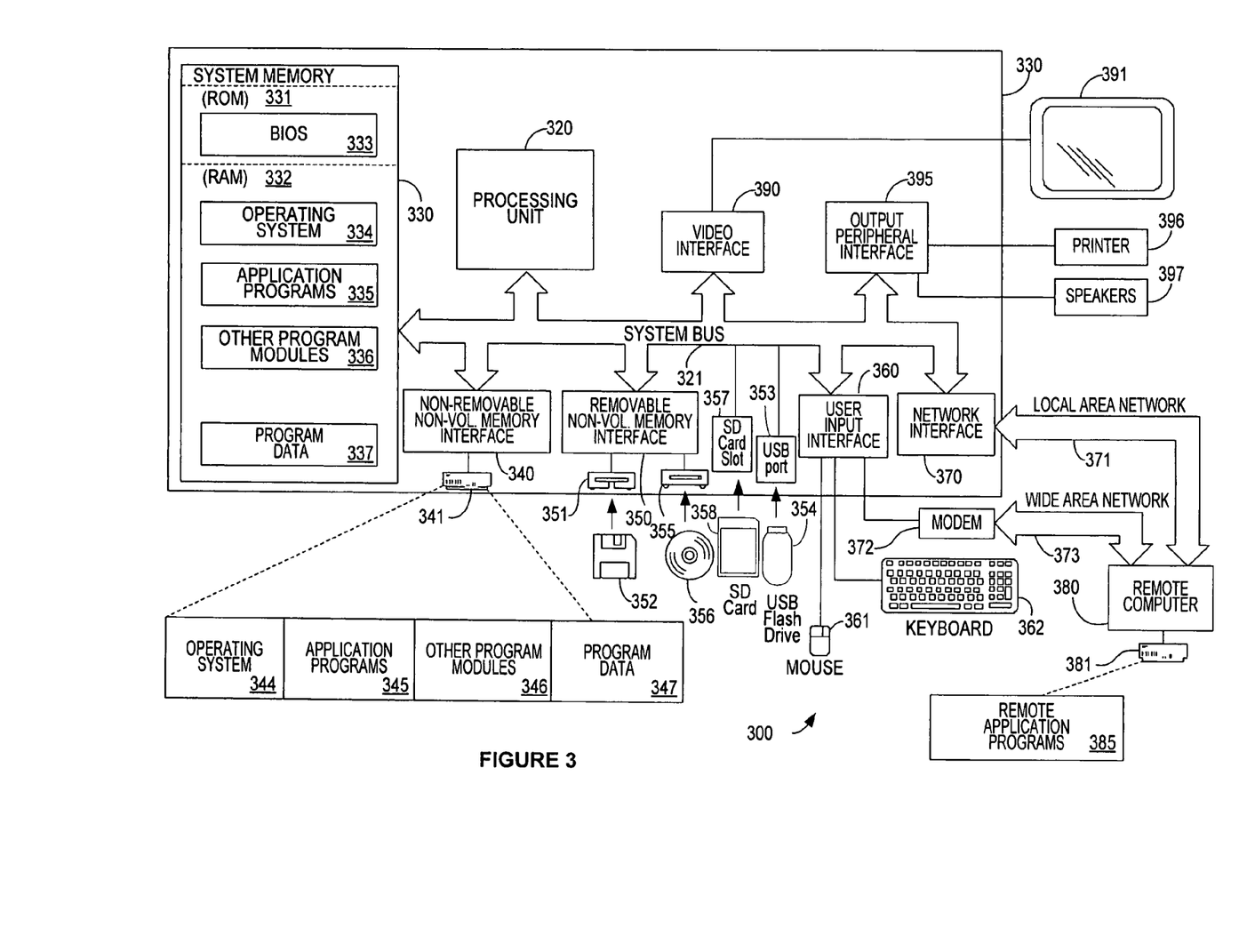
FIG. 3 is a schematic diagram illustrating an exemplary architecture of a computing device that may be used as part of a wireless network implementing a communication configuration process in accordance with an embodiment of the invention.

FIG. 3 illustrates an example of a suitable computing system environment 300 in which the invention may be implemented. The computing system environment 300 is only one example of a suitable computing environment and is not intended to suggest any limitation as to the scope of use or functionality of the invention. Nor should the computing environment 300 be interpreted as having any dependency or requirement relating to any one or combination of components illustrated in the exemplary operating environment 300. Although at least one embodiment of the invention does include each component illustrated in the exemplary operating environment 300, another more typical embodiment of the invention excludes some or all non-essential components, for example, input/output devices other than those required for network communications.

That said, one example system for implementing the invention includes a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures.

The computer 310 typically includes a variety of computer-readable media. Computer-readable media can be any available media that can be accessed by the computer 310 and include both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 330 includes computer storage media in the form of volatile and/or nonvolatile memory such as read only memory (ROM) 331 and random access memory (RAM) 332. By way of example, and not limitation, FIG. 3 illustrates operating system 334, application programs 335, other program modules 336 and program data 337.

The computer 310 may also include other removable and non-removable, volatile and nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The computer system may include interfaces for additional types of removable non-volatile storage devices. For instance, the computer may have a USB port 353 that can accept a USB flash drive (UFD) 354, or a SD card slot 357 that can accept a Secure Digital (SD) memory card 358. A USB flash drive is a flash memory device that is fitted with a USB connector that can be inserted into a USB port on various computing devices. A SD memory card is a stamp-sized flash memory device. Both the USB flash drive and SD card offer high storage capacity in a small package and high data transfer rates.

The drives and their associated computer storage media, discussed above and illustrated in FIG. 3, provide storage of computer-readable instructions, data structures, program modules and other data for the computer 310. In FIG. 3, for example, hard disk drive 341 is illustrated as storing an operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as a mouse, trackball or touch pad. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 by way of an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 397 and printer 396, which may be connected through an output peripheral interface 394 or the like.

The computer 310 preferably operates or is adaptable to operate in a networked environment using logical connections to one or more remote computers, such as a remote computer 380. The remote computer 380 may be a personal computer, a server, a router, a peer device or other network node, and typically includes some or all of the elements described above relative to the computer 310, although only a memory storage device 381 has been illustrated in FIG. 3. The logical connections depicted in FIG. 3 include a LAN 371 and a WAN 373, but may also include other networks.

When used in a LAN environment, the computer 310 is connectable to the LAN 371 through a network interface or adapter 370. The computer 310 may also include a modem 372 or other means for establishing communications over the WAN 373. The modem 372, which may be internal or external, may be connected to the system bus 321 by way of the user input interface 360 or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Having discussed one of many suitable computing device environments, the details pertaining to various embodiments of the invention will now be discussed in greater depth. As discussed above, wireless bandwidth in a wireless LAN can sometimes be more efficiently used, depending upon the exact current network parameters, if STAs (Stations) directly communicate with each other without going through an AP (Access Point). According to various embodiments of the invention, a mechanism is provided for dynamically establishing an optimal communication mode between wireless devices, such that STAs communicate directly or indirectly depending upon which mode would yield higher throughput under present network conditions and configuration.

In an embodiment of the invention, a measurement based mechanism is used to decide which communication mode is more efficient. If it is decided that direct communication is optimal, then the two STAs can either form an adhoc network or with soft MAC capability, as that provided by Microsoft's™ Native WiFi, an STA can be dynamically configured to become a wireless repeater access point (soft AP). The measurements are also used to detect the support of traffic prioritization at the AP and if an application needs support for traffic prioritization, it can be dynamically enabled at the wireless repeater AP if the two STAs decide to communicate directly with one of them becoming the wireless repeater AP.

Embodiments of the invention are particularly, though not exclusively, useful in home entertainment scenarios. Media streaming between devices in the home over wireless LAN can be seriously constrained by the limited bandwidth of the wireless LAN. Further, interference from other applications and lack of prioritization support at the AP can degrade the media application's user experience further. Embodiments of the invention help avoid wastage of wireless bandwidth. In further embodiments of the invention, multimedia streams are protected from other traffic where the physical location of entertainment devices allows for this. The invention also has application in any other scenario where direct communication between STAs is permitted.

Figure 4:
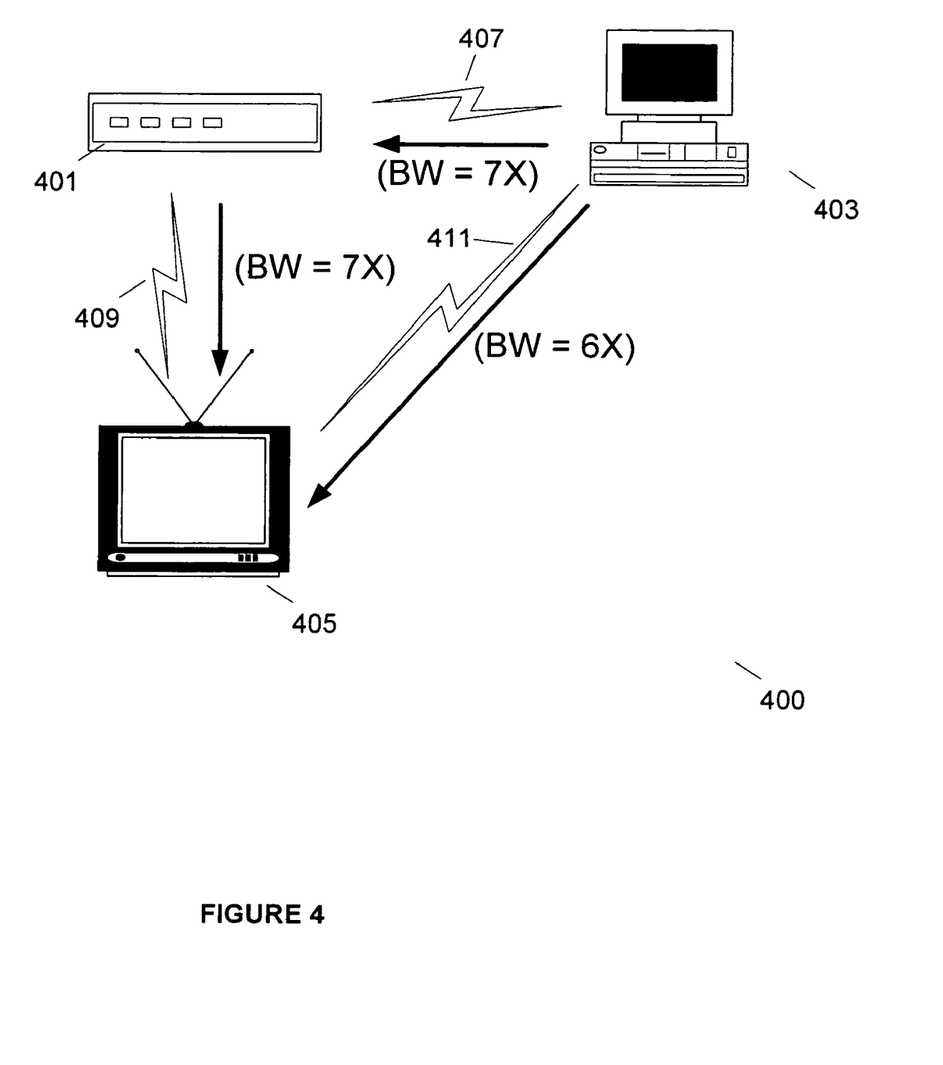
FIG. 4 is a schematic illustration of a network environment within which embodiments of the invention may be implemented, showing the bandwidth of various connections.

FIG. 4 illustrates a wireless LAN environment 400 having an AP 401, a media sending device 403, and a media receiving device 405. The media receiving device 405 is illustrated as a television and the media sending device 403 is illustrated as a personal computer. However, these devices are merely examples, and embodiments of the invention are not limited by these examples. The wireless transmissions 407, 409, 411, are designated by their relative bandwidth, although it will be appreciated that the sender who must decide which mode to operate in will not see the bandwidth at each leg, only the total bandwidth that it experiences. Thus, if there is a bottleneck in one or more links, the sender will experience the bottleneck without necessarily knowing where it is occurring.

As illustrated, the link 407 between the media sending device 403 and the AP 401 has a bandwidth of 7×, as does the link 409 from the AP 401 to the media receiving device 405. Many factors can affect bandwidth including appliances, toys, and physical structures. As illustrated, the direct link 411 from the media sending device 403 to the media receiving device 405 has a bandwidth of 6×. In this scenario, the maximum bandwidth that the media sending device will experience in indirect mode, i.e. going through the AP 401, will be 7× due to links 407, 409. However, the maximum bandwidth experienced by the media sending device 403 in direct mode will be 6×. Thus, in this case the sending and receiving devices 403, 405 will experience greater throughput by communicating via the AP 401 in indirect mode.

Figure 5:
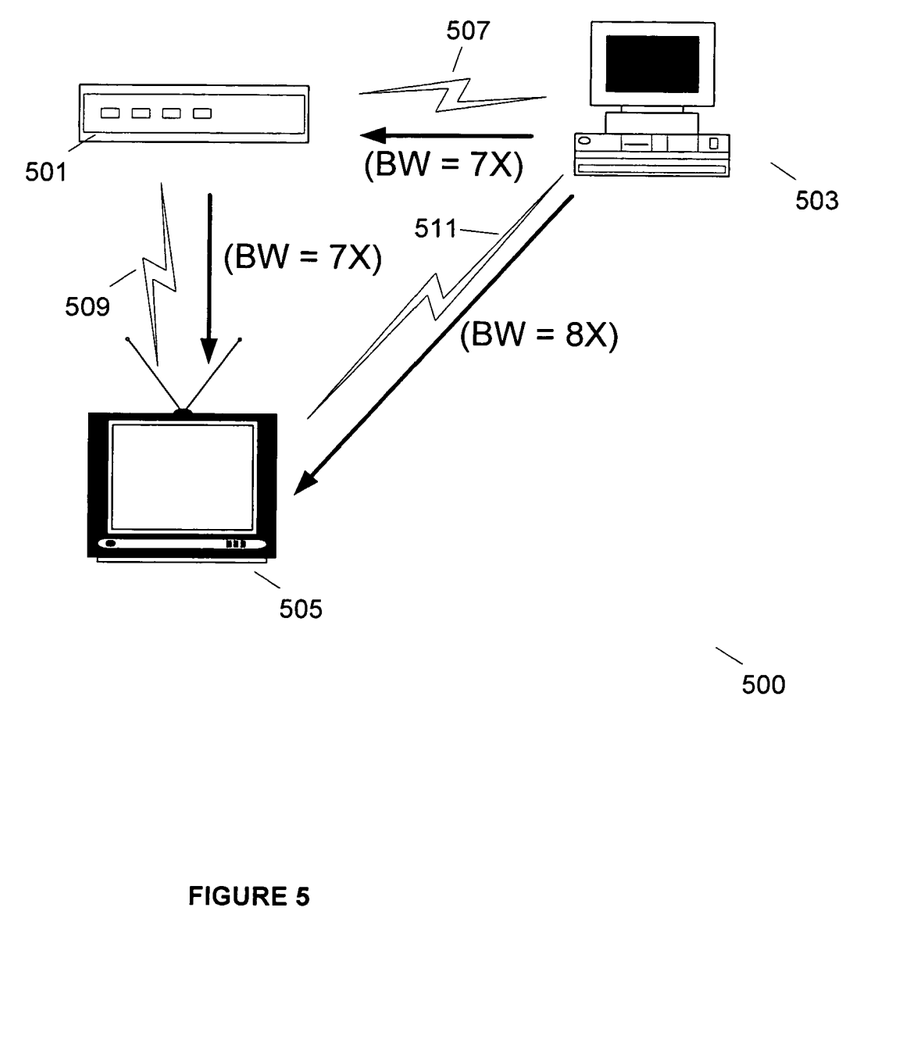
FIG. 5 is a schematic illustration of a network environment within which embodiments of the invention may be implemented, showing alternative bandwidth of various connections.

FIG. 5 illustrates a wireless LAN environment 500 that is the same as that of FIG. 4, i.e. having an AP 501, a media sending device 503, and a media receiving device 505. Again, the wireless links 507, 509, 511, are designated by their relative bandwidths. In this illustration, however, the link bandwidths are different. The link 507 between the media sending device 503 and the AP 501 still has a bandwidth of 7×, as does the link 509 from the AP 501 to the media receiving device 505. However, the direct link 511 from the media sending device 503 to the media receiving device 505 now has a bandwidth of 8×. In this scenario, the maximum bandwidth that the media sending device will experience in indirect mode, i.e. going through the AP 501, will still be 7× while the maximum bandwidth experienced by the media sending device 503 in direct mode will be 8×. Thus, in this case the sending and receiving devices 503, 505 will experience greater throughput by communicating in direct mode, i.e., bypassing the AP 501.

Figure 6:
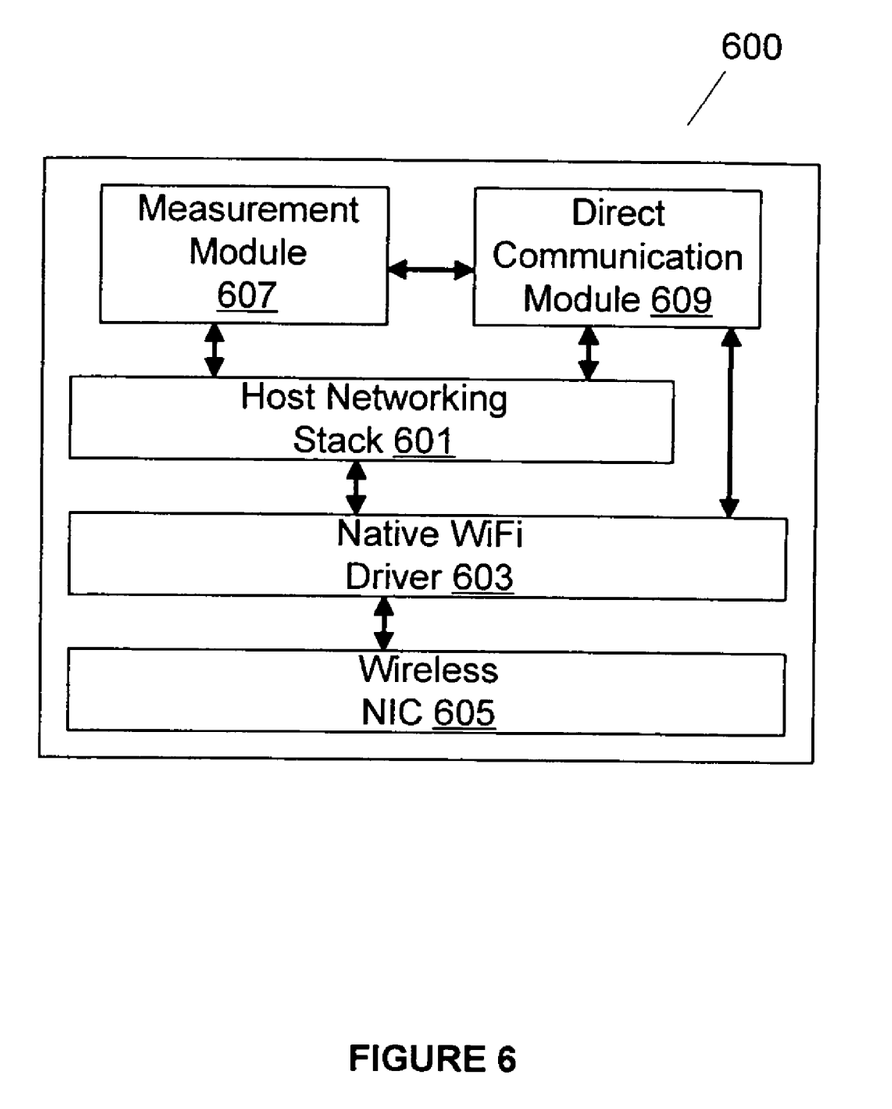
FIG. 6 is a schematic illustration showing an architecture for allowing the dynamic selection of either direct or indirect communications modes within embodiments of the invention.

An architecture for allowing the dynamic selection of either direct or indirect communications modes is illustrated schematically in FIG. 6. This architecture need not be implemented by all entities in the wireless network, e.g., by the AP 401, the sending device 403, and the receiving device 405. Rather, the sending device may evaluate bandwidths and select a communications mode without any architectural changes on the other devices, as will be discussed in greater detail below.

The illustrated architecture 600 supplements the existing wireless stack, driver, and NIC to allow a decision as to the type of communications to send, and to allow implementation of that decision. Thus, the sending host 600 implements the ordinary networking stack 601, native wireless driver 603, and wireless network interface card (NIC) 605. In addition, the sending host also implements a Measurement Module 607 and a Direct Communication Module 609. The Measurement Module 607 and Direct Communication Module 609 are interconnected to allow communication of messages there between. For example, if the Measurement Module 607 determines that direct communications would provide better throughput, as will be described below, then it can activate the Direct Communication Module 609. Moreover, the Measurement Module 607 and the Direct Communication Module 609 are linked to the remaining components to allow them to execute their functions. For example, the Measurement Module 607 is bidirectionally linked to the host networking stack 601 so as to send and receive data related to bandwidth measurement. Moreover, the Direct Communication Module 609 is also bidirectionally linked to the stack 601 as well as to the native wireless driver 603 to allow it to implement direct communications when called for.

Thus, in operation, the Measurement Module 607 actively measures the bandwidth of the current (e.g., indirect) and alternative (e.g., direct) communications channels. Such measurements may be accomplished in a number of ways. In an embodiment of the invention, the bandwidths of the relevant channels are estimated using standard packet pair techniques. Such techniques involve sending pairs of packets back-to-back over the link in question and observing any alterations in spacing between the packets. Typically, the greater the dilation of the packet spacing, the lower the bandwidth on the link, although there are complications to using such techniques, and as such they should be understood to yield only a rough estimate of bandwidth. Another measurement mechanism is sometimes referred to as direct probing. This technique involves sequentially transmitting higher and higher bandwidth signals on the relevant link until a bandwidth limit is found whereat the transmitted material does not come through the link or is substantially delayed or dispersed. In this manner, the Measurement Module 607 causes both the direct and indirect links to be probed to determine their respective bandwidths. If it is determined that direct communications would yield better throughput than indirect communications, then the Measurement Module 607 activates the Direct Communication Module 609. The manner in which the Direct Communication Module 609 operates and the host changes its operation will be discussed below with greater specificity. In an embodiment of the invention, the Measurement Module 607 and Direct Communication Module 609 may each be deactivated for scenarios where it is not desirable, due to policy reasons or otherwise, for two wireless devices to directly communicate with each other without going through an AP.

Figure 7A:
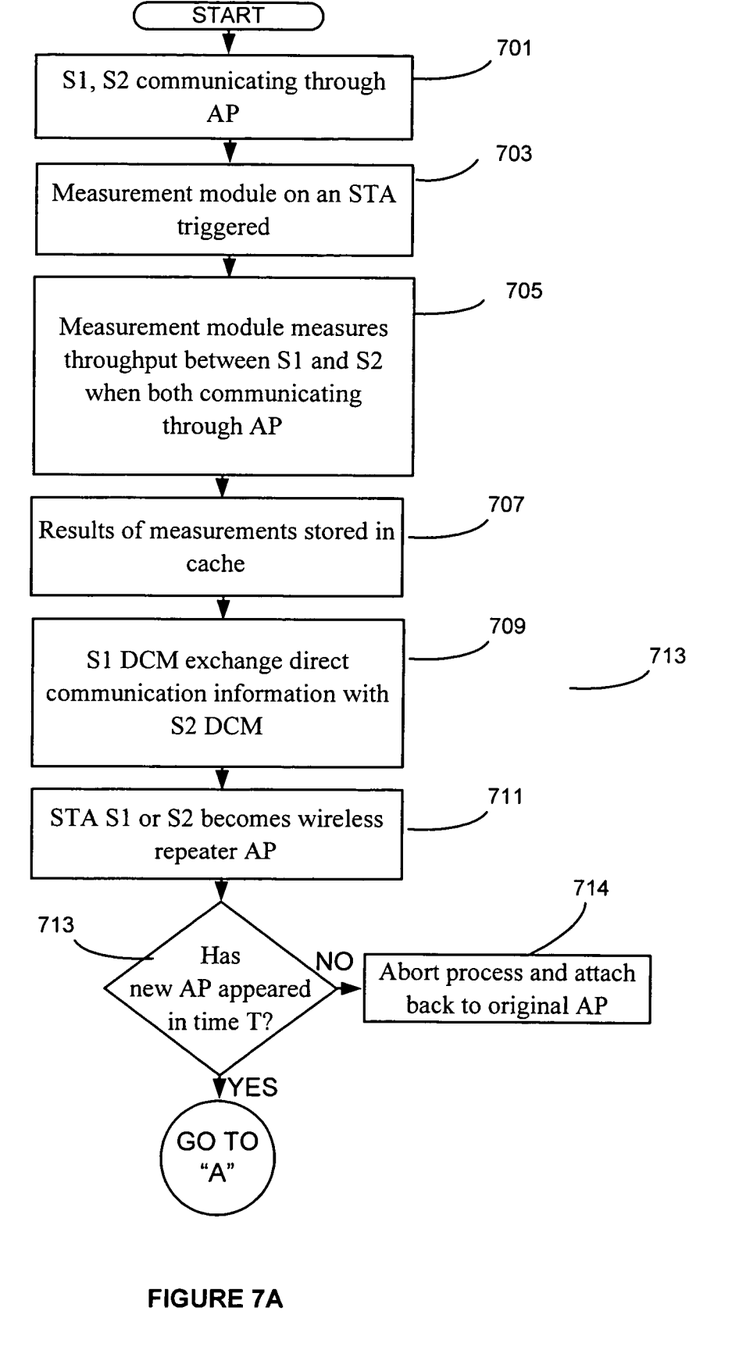
FIG. 7A sets forth a first portion of a flow chart corresponding to a process of dynamically altering the communication mode between two nodes in a wireless network according to an embodiment of the invention.
Figure 7B:
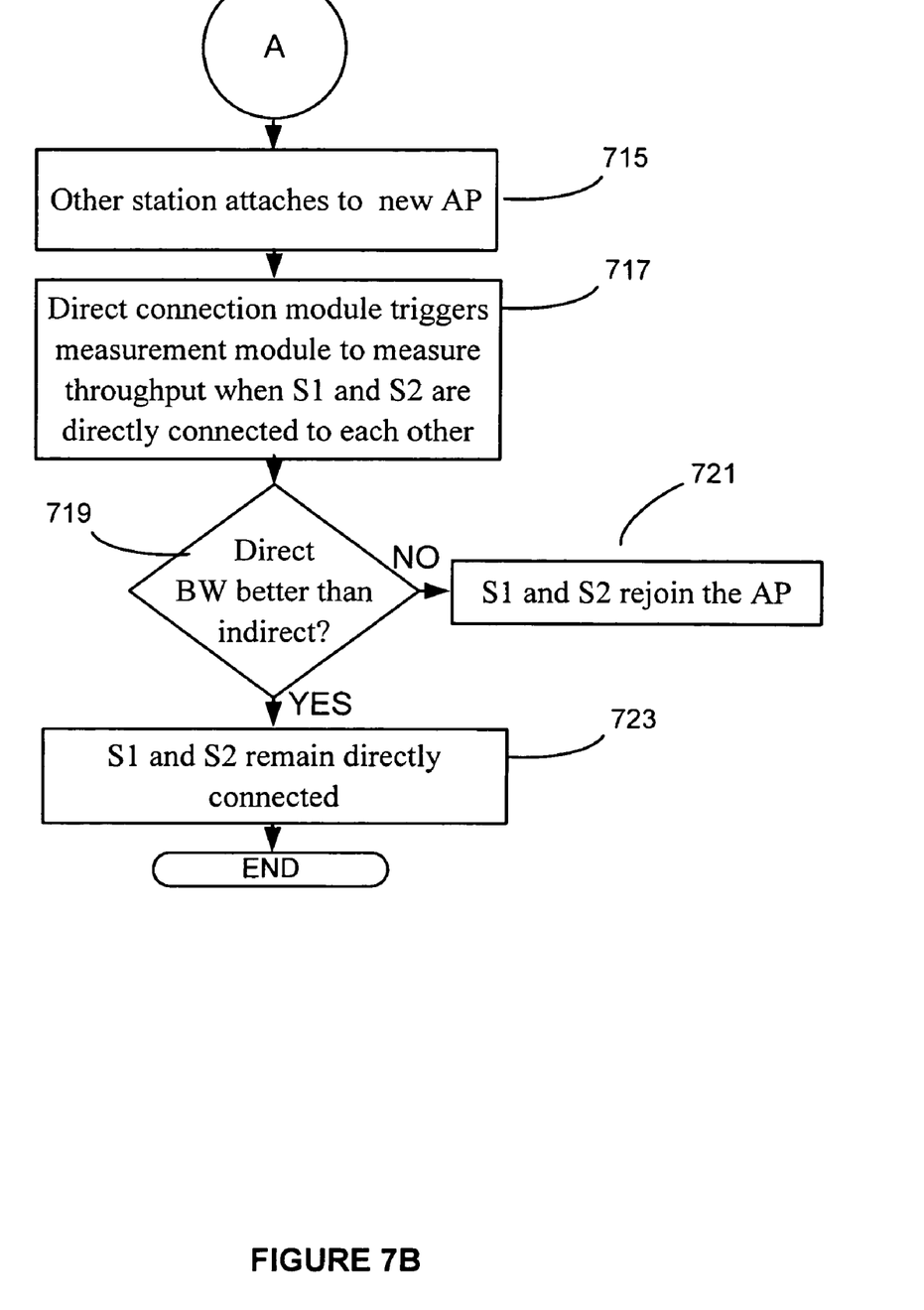
FIG. 7B sets forth a second portion of a flow chart corresponding to a process of dynamically altering the communication mode between two nodes in a wireless network according to an embodiment of the invention.

FIGS. 7A and 7B set forth, in two parts, a flow chart corresponding to a process of dynamically altering the communication mode between two nodes in a wireless network according to an embodiment of the invention. At step 701 of the flowchart 700, two wireless stations S1 and S2 are initially communicating with each other through an AP. At step 703 the measurement module on an STA is triggered by a multimedia application (or another application requiring significant wireless bandwidth) that is communicating with another STA attached to the same AP. Such triggering occurs either when the application starts or when the application finds the current throughput on the wireless network to be unacceptable. On receiving this trigger, in step 705 the measurement module on S1 measures the throughput between S1 and S2 when both are communicating through the AP. The measurement module on S2 participates in these measurements. These measurements are performed using existing measurement techniques such as packet pair and active probing as discussed above. The results of these measurements are stored in a cache in step 707.

After the first set of measurements for throughput between S1 and S2 when they are communicating through an AP are complete, Direct Communication Module (DCM)

on S1, exchanges information with the corresponding DCM module on S2 for direct communication between S1 and S2 in step 709. This information includes in an embodiment of the invention the MAC address for the two STAs among other things like security information and is preferably encrypted during transmission. The MAC address is used to identify the wireless repeater AP (and acts as the BSSID) for direct communication between S1 and S2. After this information is communicated, one of the two STAs (S1 or S2) becomes a wireless repeater AP in step 711. Alternatively, S1 and S2 can join in an adhoc fashion, but this raises greater security concerns. The decision as to which of S1 or S2 becomes the wireless repeater AP can be made by any mechanism and is mutually agreed upon and communicated between the two devices using their respective DCMs before they switch to the new network formed by the wireless repeater AP.

Mechanisms for selecting which STA should act as the wireless repeater include a random number generator, a criteria such as which has a smaller ID, etc., without limitation. If it is known which of S1 or S2 has a higher probability of acting as the source of multimedia content. For example, if one of S1 or S2 is a media center PC, it may be more useful to have that device become the wireless repeater AP. This is preferred, though not required, in that it allows yet another STA S3 to connect directly to the wireless repeater AP device as will be discussed below if another multimedia application is started from the wireless repeater AP device to S3. A device may become a wireless repeater AP for example by calling the Native WiFi (or softAP) functionality on the wireless card. The other station waits for the new AP (the wireless repeater AP) to appear for a fixed duration of time T in step 713.

If the two STAs do not get directly attached to each other within a fixed period of time, they abort the process and attach back to the original AP at step 714. If the other station sees the wireless repeater AP, it attaches to it in step 715, irrespective of the signal strength from the two visible APs. Stations S1 and S2 directly attach to each other by one STA becoming an STA for the other STA which acts as a wireless repeater AP to the original AP. Support for traffic prioritization is automatically enabled on the wireless repeater AP if such support is available. The direct connection module then triggers the measurement module to run another set of measurements in step 717, this time to measure the throughput when S1 and S2 are directly connected to each other. These measurements are preferably run with prioritization turned on at the wireless repeater AP.

In step 719, it is determined whether S1 and S2 obtain better throughput when directly connected to each other than if when connected through the AP. If so, then S1 and S2 remain connected directly at step 721. If on the other hand, measurement indicates that the throughput is lower as compared to when they were connected through the AP, S1 and S2 rejoin the AP in step 723.

As noted above, in an embodiment of the invention, two STAs S1 and S2 communicate directly with each other by means of one of them becoming a wireless repeater AP attached to the original AP. This enables S1 and S2 to continue communicating with the original AP and with any devices attached to the original AP as well as the Internet if the original AP is connected to the Internet through an Internet Gateway Device. This is because a wireless repeater AP can act as an STA to one AP while simultaneously acting as an AP to another STA. If connectivity of S1 and S2 to other devices and to the Internet is not desired, then S1 and S2 can directly communicate with each other by one of them becoming an AP (rather than wireless repeater AP) and the two devices can communicate over a channel orthogonal to the original AP in an embodiment of the invention. Note that even though a wireless repeater based direct communication uses the same channel as the original AP, there is still a savings in wireless bandwidth as communications between S1 and S2 do not need to consume scarce wireless bandwidth twice and happen directly between S1 and S2 by using one of S1 and S2 as the wireless repeater AP.

In the event that the devices S1 and S2 are mobile, or if for any other reason the bandwidth experiences high fluctuations, the measurement module is also triggered if the multimedia application is unable to get enough bandwidth to meet its requirements in an embodiment of the invention. The measurement module may then decide to either end the direct connectivity between S1 and S2 (in case they were directly connected) and make them communicate through the AP or vice versa based on the new set of measurements.

In an embodiment of the invention, "load balancing" or load optimization on the APs is provided using the above mechanisms if there are multiple APs providing coverage in an area. In this embodiment of the invention, each STA runs a measurement between itself and each of the various APs with which it can communicate to detect the available bandwidth with respect to these APs. It then joins the AP that provides the maximum available throughput. This yields better results than signal strength based load balancing schemes, because signal strength does not necessarily provide any information about the remaining available bandwidth on an AP. Rather, signal strength only provides information about the how strong the wireless channel is between the STA and the AP. While signal strength can affect throughput, there are a number of other factors that can affect throughput between two devices. For example, signal strength may be high even though the capacity of one device or the other is almost entirely consumed by another task.

Figure 8:
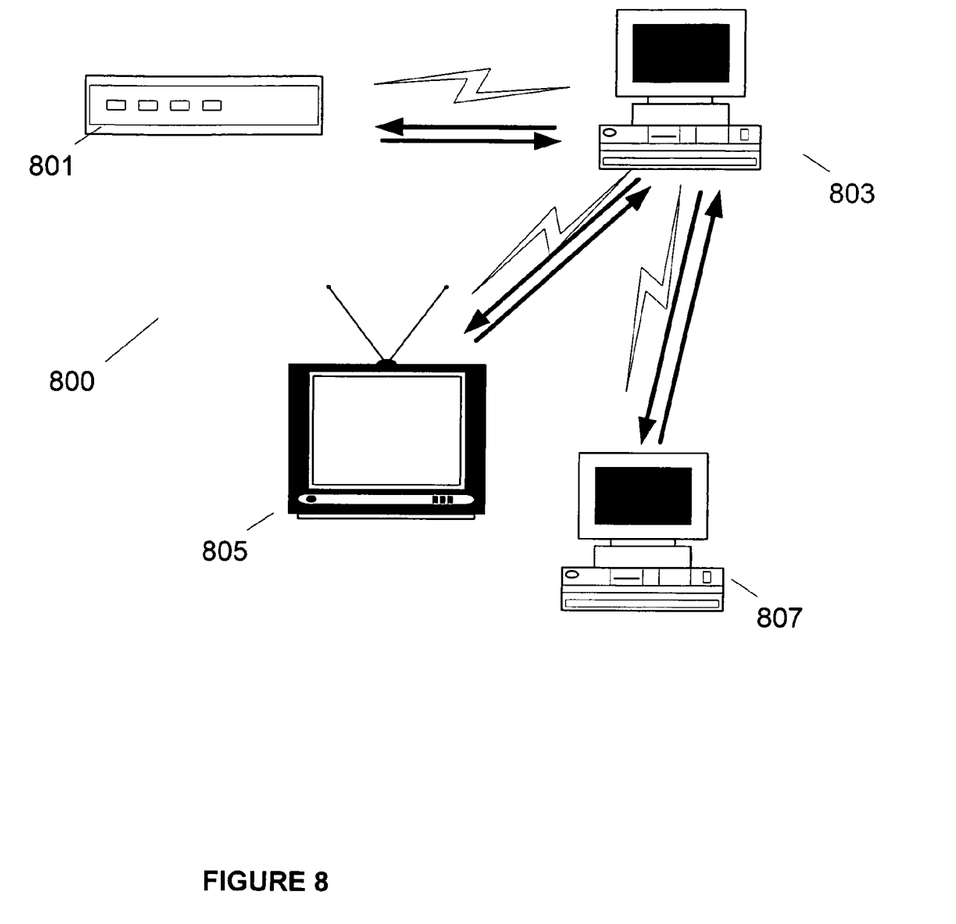
FIG. 8 illustrates an environment in keeping with an embodiment of the invention wherein two stations have determined that data throughput is optimal when communicating directly with a media source rather than through an access point.

FIG. 8 illustrates an environment in keeping with an embodiment of the invention wherein two stations have determined that data throughput is optimal when communicating directly with a media source rather than through an access point. In particular, in the illustrated environment 800, an access point 801 is in direct communication with a wireless station 803. However, station 803 is acting as a wireless repeater access point with respect to wireless stations 805 and 807.

It will be appreciated that a new and useful system for wireless LAN node communication mode selection has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of selecting a communication mode for a first wireless device, the first wireless device being in wireless communication range of a wireless access point using a channel and a second wireless device the method comprising:
    receiving a trigger indicating a start up of a multimedia application on the first wireless device;
    measuring the data throughput between the first wireless device and the second wireless device in indirect mode wherein communications between the first wireless device and the second wireless device are executed via the wireless access point;
    measuring the data throughput between the first wireless device and the second wireless device in direct mode wherein communications between the first wireless device and the second wireless device are executed directly, omitting the wireless access point;
    determining whether the measured throughput is greater in the indirect mode or the direct mode; and
    selecting, in response to the trigger, the communications mode having the higher measured throughput for communications between the first and second devices, wherein the direct mode comprises the first wireless device reconfigured as a wireless repeater access point using the channel.

2. The method according to claim 1, wherein the first and second wireless devices are currently in a direct communications mode, and wherein selecting the communications mode having the higher measured throughput for communications between the first and second devices comprises remaining in the direct communications mode.

3. The method according to claim 1, wherein the first and second wireless devices are currently in an indirect communications mode, and wherein selecting the communications mode having the higher measured throughput for communications between the first and second devices comprises remaining in the indirect communications mode.

4. The method according to claim 1, wherein the first and second wireless devices are currently in a mode selected from the group consisting of an indirect communications mode and a direct communications mode, and wherein selecting the communications mode having the higher measured throughput for communications between the first and second devices comprises switching the communications mode from one member of the group to the other.

5. A computer-readable medium encoded with instruction capable of being executed by a computer for selecting a communication mode for a first wireless device, the first wireless device being in wireless communication range of a wireless access point using a channel and a second wireless device the computer-readable instructions comprising instructions for:
    receiving a trigger indicating a start up of a multimedia application on the first wireless device;
    measuring the data throughput between the first wireless device and the second wireless device in indirect mode wherein communications between the first x4ireless device and the second wireless device are executed via the wireless access point;
    measuring the data throughput between the first wireless device and the second wireless device in direct mode wherein communications between the first wireless device and the second wireless device are executed directly, omitting the wireless access point;
    determining whether the measured throughput is greater in the indirect mode or the direct mode; and
    selecting, in response to the trigger, the communications mode having the higher measured throughput for communications between the first and second devices, wherein the direct mode comprises the first wireless device reconfigured as a wireless repeater access point using the channel.

6. The computer-readable medium according to claim 5, wherein the first and second wireless devices are currently in a direct communications mode, and wherein the instructions for selecting the communications mode having the higher measured throughput for communications between the first and second devices further comprise instructions for remaining in the direct communications mode.

7. The computer-readable medium according to claim 5, wherein the first and second wireless devices are currently in an indirect communications mode, and wherein the instructions for selecting the communications mode having the higher measured throughput for communications between the first and second devices further comprise instructions for remaining in the indirect communications mode.

8. The computer-readable medium according to claim 5, wherein the first and second wireless devices are currently in a mode selected from the group consisting of an indirect communications mode and a direct communications mode, and wherein the instructions for selecting the communications mode having the higher measured throughput for communications between the first and second devices further comprise instructions for switching the communications mode from one member of the group to the other.

9. A method of load balancing in a wireless network comprising a first wireless station, a second wireless station, and a wireless access point using a channel, the method comprising:
    receiving a trigger indicating a start up of a multimedia application on the first wireless station;
    measuring a first data throughput between the first wireless station and the second wireless station via the wireless access point;
    measuring a second data throughput between the first wireless station and the second wireless station via a path without the first wireless access point;
    determining that the second data throughput is greater than the first data throughput; and in response to the determining, establishing communications between the first wireless station and the second wireless station, wherein the second wireless station is reconfigured as a wireless repeater access point using the channel with respect to the first wireless station and maintained as a wireless station with respect to the wireless access point.

10. The method according to claim 9, wherein measuring the throughput in the direct mode and indirect mode comprises sending packet pair probes between the first wireless station and the second wireless station and inferring throughput from delay induced between packets.

11. The method according to claim 9, wherein the first wireless station is not in direct mode or indirect mode, and wherein establishing communications between the first wireless station and the second wireless station comprises causing the first wireless station to become attached to the second wireless station.

12. The method according to claim 9, wherein a respective signal strength is associated with communication between the first wireless station and the second wireless station in direct mode and in indirect mode, and wherein the signal strength associated with communication between the first wireless station and the second wireless station in indirect mode is less than the signal strength associated with communication between the first wireless station and the second wireless station in direct mode.

* * * * *